(12) United States Patent
Thompson et al.

(10) Patent No.: US 10,103,770 B2
(45) Date of Patent: Oct. 16, 2018

(54) TRANSCEIVER CIRCUITS

(71) Applicant: TRW Limited, Solihull (GB)

(72) Inventors: Martin John Thompson, Solihull (GB); Adam John Heenan, Chesterfield (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 15/360,466

(22) Filed: Nov. 23, 2016

(65) Prior Publication Data

US 2017/0149468 A1    May 25, 2017

(30) Foreign Application Priority Data

Nov. 24, 2015 (GB) .................................. 1520756.6

(51) Int. Cl.
*H04B 1/38* (2015.01)
*H04N 11/02* (2006.01)
(Continued)

(52) U.S. Cl.
CPC ..................................... *H04B 1/40* (2013.01)

(58) Field of Classification Search
USPC ....... 375/219, 220, 222, 221, 229–236, 240, 375/240.26, 240.27, 240.28, 259, 285,
(Continued)

(56) References Cited

U.S. PATENT DOCUMENTS 9,178,559 B2 * 11/2015 Aoulad Ali .............. H04B 1/10
2009/0121918 A1 * 5/2009 Shirai ...................... G01S 7/023
342/159
(Continued)

FOREIGN PATENT DOCUMENTS

EP          0779519 A1    6/1997
EP          2439552 A1    4/2012
(Continued)

OTHER PUBLICATIONS

Great Britain Search Report, Application No. GB 1520756.6, dated May 25, 2016.

*Primary Examiner* — Linda Wong
(74) *Attorney, Agent, or Firm* — MacMillan, Sobanski & Todd, LLC (57) ABSTRACT

A transceiver circuit includes a signal generator arranged to generate an output signal; a transmitter coupled to the signal generator so as to transmit the output signal; a receiver arranged to receive a received signal; a mixer coupled to the receiver and to the signal generator so as to mix the output signal and the received signal so as to produce a mixed signal; and at least one filter coupled to the mixer so as to act upon the mixed signal to produce a filtered signal. The filtered signal includes an unwanted portion of the output signal is received at the receiver without having been reflected from a target. The transceiver circuit further includes a correction circuit arranged to generate a simulated waveform that simulates the behavior of the each filter to the unwanted portion of the output signal and applies a correction so as to remove the simulated waveform from the filtered signal.

13 Claims, 8 Drawing Sheets

(51) Int. Cl.
 *H03H 7/30* (2006.01)
 *H04B 1/40* (2015.01)

(58) Field of Classification Search
 USPC ....... 375/284, 278, 295, 296, 316, 340, 346, 375/350, 354, 356, 362
 See application file for complete search history.

(56) References Cited

U.S. PATENT DOCUMENTS

| | | | |
|---|---|---|---|
| 2010/0214965 A1* | 8/2010 | Kim | H04W 16/14 370/280 |
| 2011/0115666 A1* | 5/2011 | Feigin | G01S 7/023 342/22 |
| 2012/0183025 A1* | 7/2012 | Manickam | H04L 25/03057 375/222 |
| 2013/0044791 A1* | 2/2013 | Rimini | H04B 1/109 375/219 |
| 2013/0241766 A1* | 9/2013 | Kishigami | G01S 7/023 342/159 |
| 2013/0326912 A1 | 12/2013 | Lindsay et al. | |
| 2014/0140250 A1* | 5/2014 | Kim | H04B 1/525 370/278 |
| 2015/0011172 A1* | 1/2015 | Reinhardt | H04B 1/12 455/296 |
| 2016/0285484 A1* | 9/2016 | Weissman | H04B 1/0475 |
| 2017/0207812 A1* | 7/2017 | Wyville | H04B 1/525 |

FOREIGN PATENT DOCUMENTS

| | | |
|---|---|---|
| EP | 2690456 A1 | 1/2014 |
| WO | 03/038462 A2 | 5/2003 |
| WO | 2009/027900 A1 | 3/2009 |

* cited by examiner

TRANSCEIVER CIRCUITS

CROSS-REFERENCE TO RELATED APPLICATIONS

This application claims priority from U.K. Patent Application No. GB1520756.6, filed Nov. 24, 2015, the disclosure of which is incorporated herein by reference in its entirety.

BACKGROUND OF THE INVENTION

This invention relates to a transceiver circuit, a target detection apparatus using such a transceiver circuit and a method of operating a transceiver circuit.

It is well known to use target detection systems such as radar systems in order to detect targets around an apparatus. Typically, radiation such as radio waves will be transmitted from a transmitter and received at a receiver, and by comparing what is transmitted with what is received, a determination is made as to the presence and potential position of targets around the apparatus.

Figure 1:
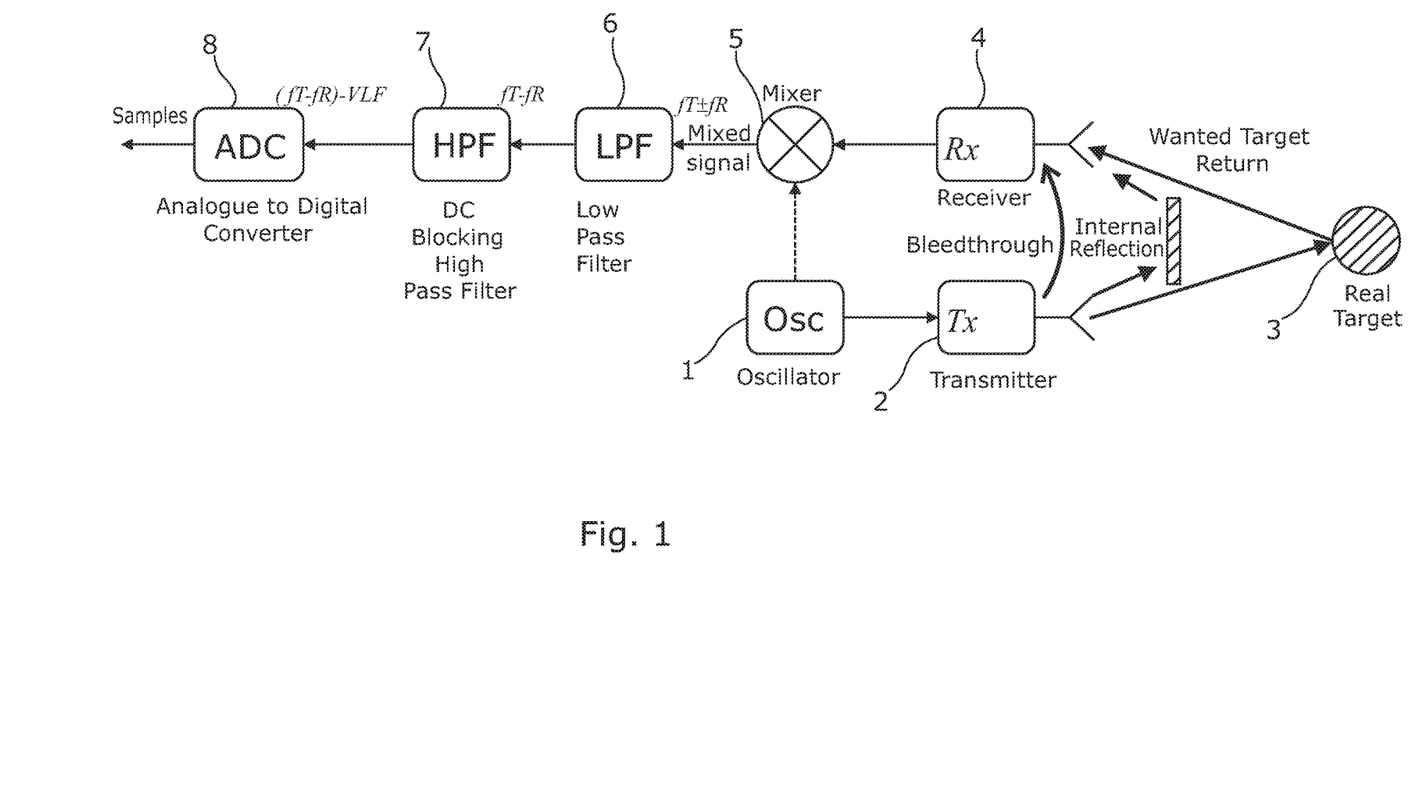
FIG. 1 illustrates a prior art radar transceiver circuit.
Figure 2A:
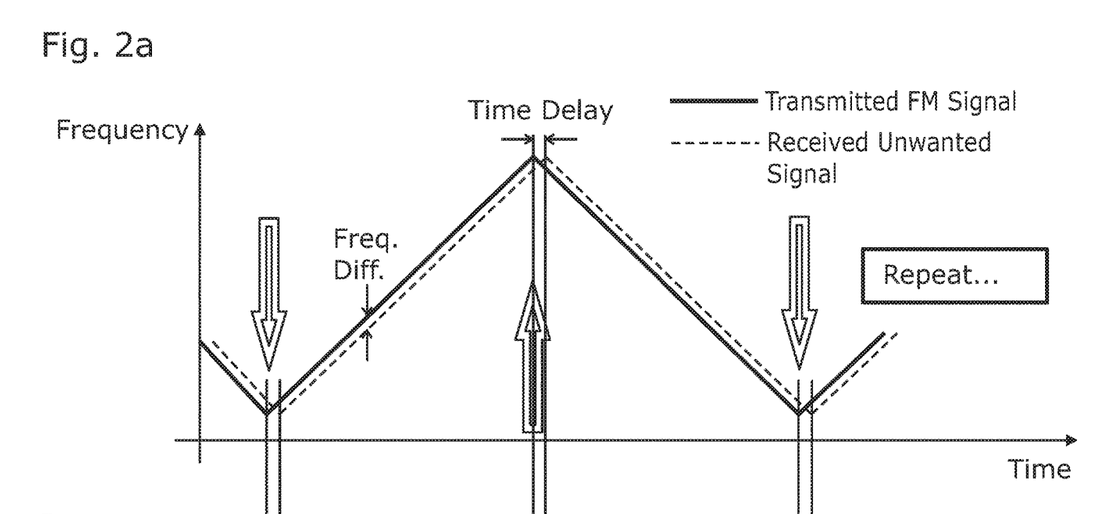
FIGS. 2a and 2b show graphs showing the effect of the unwanted portion on the circuit of FIG. 1.

An example prior art frequency modulated continuous wave radar apparatus is shown in FIG. 1 of the accompanying drawings. It comprises an oscillator 1, which produces a signal having a modulated frequency. An example of a frequency modulation pattern used is shown in FIG. 2a of the accompanying drawings, which shows in solid lines the frequency of the signal generated with time.

This signal is passed to a transmitter 2, which generates radio waves and transmits them in the direction of an area where there may be targets 3. A receiver 4 receives reflected radiation that has been reflected off any targets 3, with a time delay that depends on the range of the target. However, because no circuit is perfect some of the transmitted signal bleeds through to the receiver. Furthermore, due to very short range internal reflections within the radar apparatus or within the vehicle in which it is mounted, some of the output signal is reflected internally back to the receiver. Thus, a proportion—the unwanted portion—of the output signal is received directly at the receiver 4 with a range of very short time delays. This unwanted portion is shown in dotted lines in FIG. 2a.

The transceiver also has a mixer 5, which mixes the output and received signals. As is well known, this produces a mixed signal which will contain components at the sum and the difference of the frequencies of the output and received signals. In order to analyze only the difference signal, a low pass filter 6 is provided, which discards those components of higher frequency than the expected difference components, and a high pass filter 7, to block the DC component of the mixed signal, to produce a filtered signal, shown in the ideal case in FIG. 2b.

However, the unwanted portion will also be included in the received signal which is mixed with the output signal. Because of the short time delays, this means that, where there are discontinuities in the frequency modulation of the output signal (and particularly if there are steps in frequency), there will be large discontinuous components at relatively high frequency in the mixed signal, and response to these discontinuous components thereafter in the filters 6, 7. These are shown labeled with arrows in FIGS. 2a and 2b.

Figure 2B:
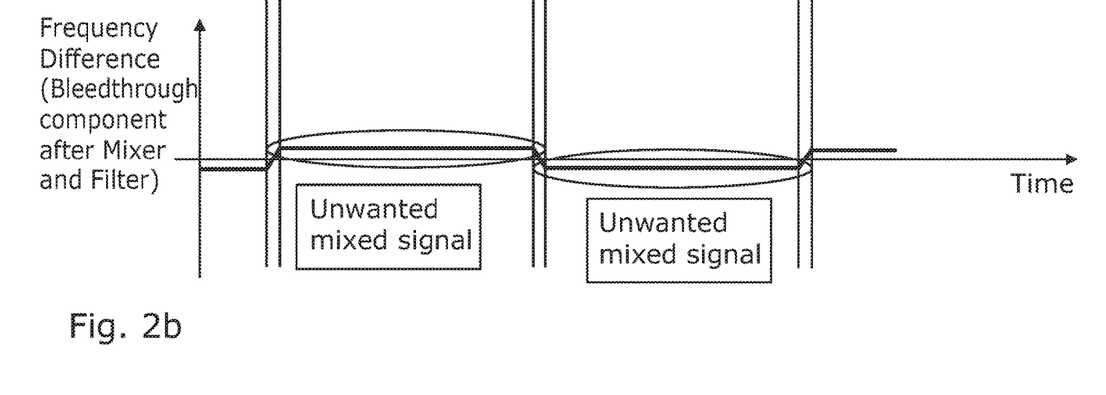
Figure 3:
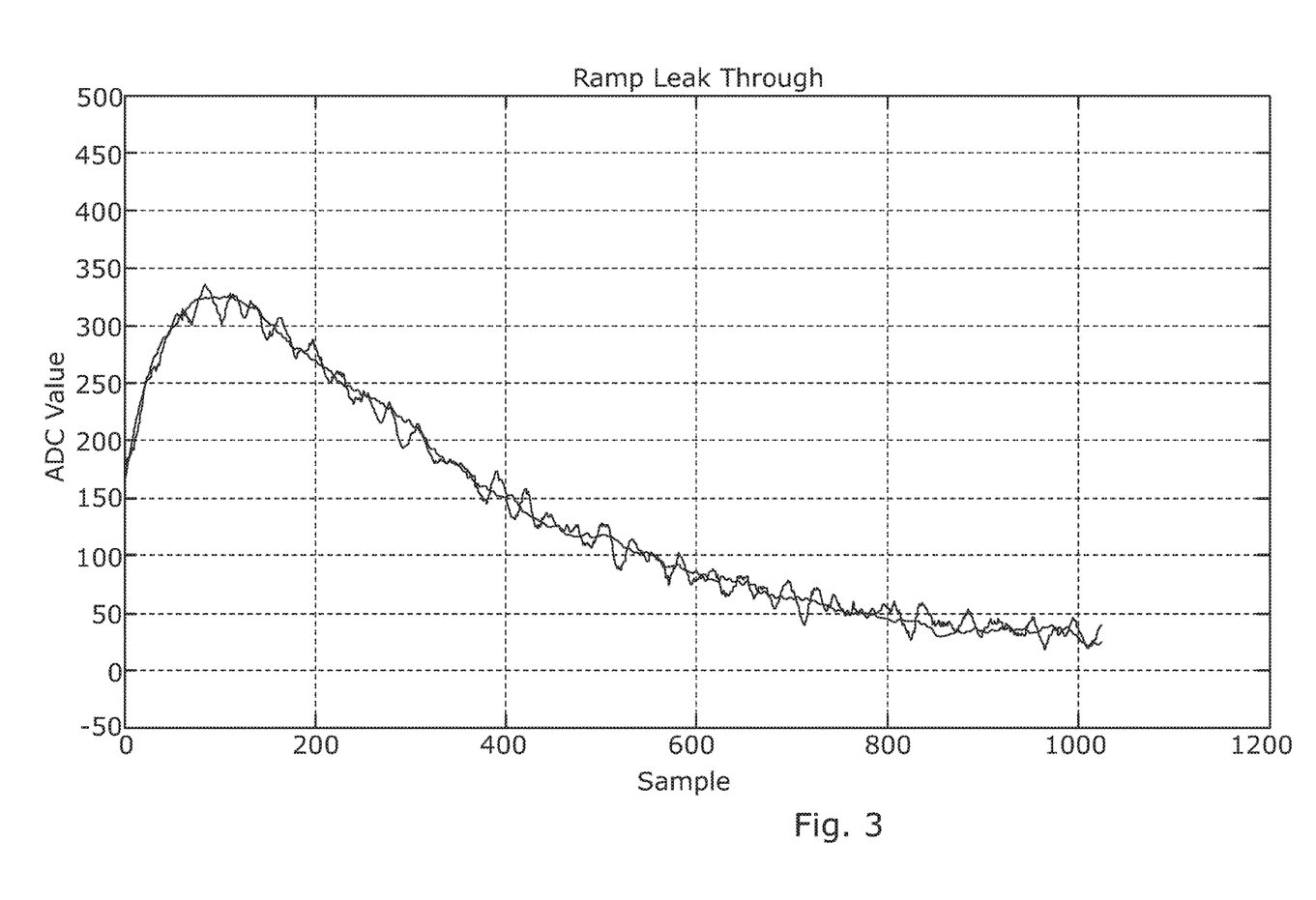
FIG. 3 shows a graph showing the effect of the unwanted portion on the circuit of FIG. 1, in the time domain.

As such, this can lead to deleterious effects in the high pass filter 7. Most practical high pass filters will have a transient response to sudden discontinuous frequency spikes such as are shown in FIG. 2b. This can be seen in FIG. 3 of the accompanying drawings, where the smoother trace shows the effects of such transients on the filtered signal, and the less smooth trace shows the underlying filtered signal. As such, it can be seen that the transients are low frequency compared with the underlying filtered signal, but with an amplitude several times that of the underlying signal.

One previous proposal to ameliorate for this problem has been to correct for the transient effects of the unwanted portion in the frequency domain. Typically, in most radar systems, a Fast Fourier Transform (FFT) will be taken of the filtered signal, after it has been digitized by an analogue to digital converter 8. This is done in this proposal. At this point, a correction is stored in memory based upon a known response of the filters 6, 7 to a known output signal and then a subtraction from the FFT in the frequency domain.

Figure 4A:
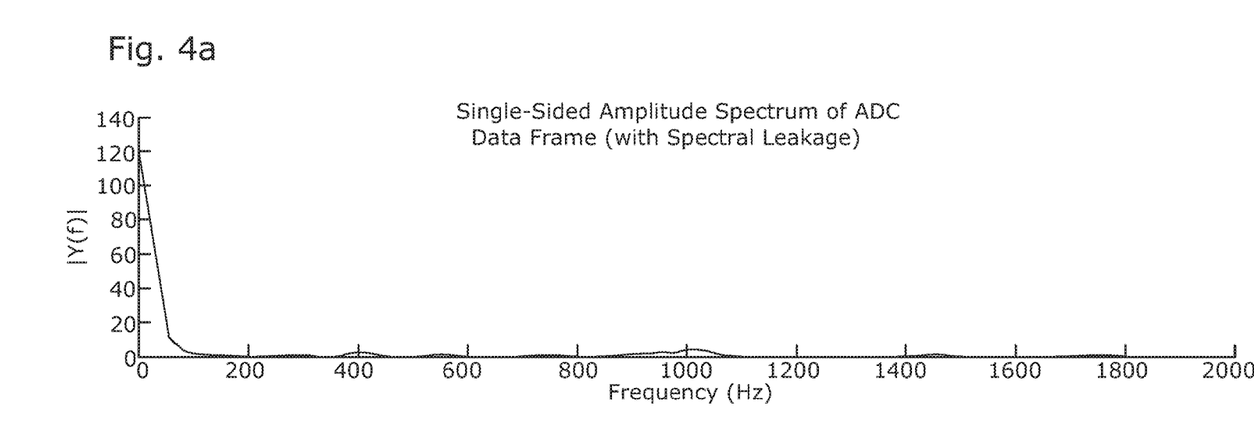
FIG. 4a shows a corresponding graph to FIG. 3, in the frequency domain.
Figure 4B:
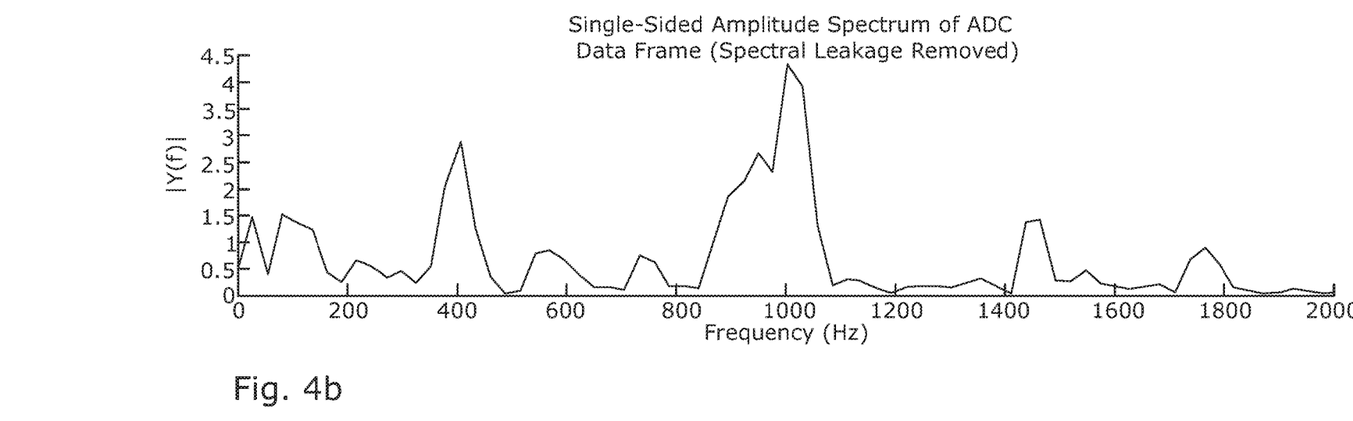
FIG. 4b shows a corresponding graph to FIG. 4a, but with the effects of the unwanted portion on the high pass filter removed in the frequency domain.

This can be seen in FIGS. 4a and 4b of the accompanying drawings, where FIG. 4a shows the FFT having been taken before any correction is applied, and FIG. 4b shows the FFT after the correction is applied. The difference in the vertical scale between the two graphs should be noted; given the low frequency character of the transient response, the subtraction is largely applied to the lowest frequency components of the FFT. Whilst this provides useful data, it loses much data that was present in the lower frequency components, which will relate to short-range targets. This effectively restricts the minimum range at which the radar system can operate.

Another alternative proposal to ameliorate for the transient response of the filters to the transients in the mixed signal is to calculate or measure the response of the filters to a given output signal unwanted portion and to save that waveform in memory. However, to record the response of the filters to all the different transients, particularly on many channels, can be inefficient use of memory.

One yet further approach is to create an additional bleedthrough signal path in the RF circuitry with 180 degree phase shift which cancels the unwanted bleedthrough signal before arriving at the filters. This can only deal with the bleedthrough source, not other unwanted reflections (e.g. from parts of the vehicle to which the radar system is mounted).

Thus, it would be desirable to provide a transceiver circuit capable of correcting for undesirable signals received by the receiver.

SUMMARY OF THE INVENTION

According to a first aspect of the invention, we provide a transceiver circuit, comprising:
  a signal generator arranged to generate an output signal;
  a transmitter coupled to the signal generator so as to transmit the output signal;
  a receiver arranged to receive a received signal;
  a mixer coupled to the receiver and to the signal generator so as to mix the output signal and the received signal so as to produce a mixed signal; and
  at least one filter coupled to the mixer so as to act upon the mixed signal to produce a filtered signal;
in which an unwanted portion of the output signal is received at the receiver without having been reflected from a target; and in which the transceiver circuit further comprises a correction circuit arranged to generate a simulated waveform being a simulation of the behavior of each filter to the unwanted portion and to apply a correction so as to remove the simulated waveform from the filtered signal.

Thus, by generating a simulated signal, the effects of the unwanted portion on each filter can be removed, whilst retaining more of the low frequency information in the filtered waveform than would be the case if the low frequency data was modified. A reflection-based target sensing system using this transceiver would therefore have better performance with respect to short range targets. This invention would have significantly lower cost in terms of memory usage than saving the response of each filter to all of the forms of the unwanted portion that it was likely to be received. It is also significantly more flexible than either of these approaches, as it will work for arbitrary forms of the output signal and so the unwanted portion; there is no need to know in advance and pre-calculate what needs to be corrected.

Typically, the at least one filter will comprise at least one of a high pass filter and a low pass filter. We have found this problem to be most troublesome where there is a high pass filter.

The transceiver circuit will typically comprise an analogue to digital converter coupled to each filter so as to convert the filtered signal from an analogue signal to a digital signal. The correction circuit may be arranged so as to apply the correction to the filtered signal before or after the filtered signal has been converted to a digital signal. In any case, the correction will be applied before the filtered signal is subjected to any frequency analysis such as a fast Fourier transform (FFT).

Where the correction circuit is arranged so as to apply the correction to the filtered signal after the filtered signal has been converted to a digital signal, the simulated waveform may be of the form of a digital signal, and the correction circuit may be arranged so as to additively remove the simulated waveform from the filtered, digital signal, for example by subtraction.

Where the correction circuit is arranged so as to apply the correction to the filtered signal before it is converted to a digital signal, the analogue to digital converter may be a differential analogue to digital converter, having two inputs; a first for the filtered signal and a second differential input for the simulated waveform.

This can allow higher gains to be used in the analogue to digital converter without it clipping, which could improve performance of a reflection-based position target detecting system using this transceiver at higher ranges.

As such, in order to create the simulated waveform, the correction circuit may comprise a digital signal creation circuit arranged to create the simulated waveform in digital form, and a digital to analogue converter arranged to convert the simulated waveform to analogue form so that it can be applied to the filtered signal.

Alternatively, the correction circuit may comprise a unwanted signal creation circuit arranged to create an estimate of the waveform of the unwanted portion and at least one further filter to which the estimate of the waveform is applied; thus the output of the at least one further filter may be the simulated waveform, as it may represent the at least one further filter's response to the unwanted portion. As such, this uses a second to simulate the response of the original filter(s). Typically, the at least one further filter should have the same, or at least approximately the same, characteristics at the original at least one filter. This may enable the at least one further filter to model the behavior of the (original) at least one filter to environmental changes such as temperature.

The correction circuit may be arranged so as to generate the simulated waveform using a plurality of parameters; typically, these will number less than 20, and typically less than 10. The parameters may comprise at least one pole, at least one zero and at least one gain of the filter; typically, the parameters will consist of two poles, two zeros and a gain.

The correction circuit may comprise a processor, which carries out any or all of the functions of the correction circuit.

According to a second aspect of the invention, there is provided a target detection system, comprising the transceiver of the first aspect of the invention arranged to transmit the output signal and to receive the received signal, and a processing circuit arranged to compare the transmitted and received signals so as to determine the presence of targets.

Typically, the target detection system would be a radar system, typically a frequency modulated continuous wave radar, in which case the transmitted and received signals would be radio signals. Alternatively, the target detection system may be a lidar system, in which case the transmitted and received signals would be light signals, or a sonar system, in which case the transmitted and received signals would be sound signals.

Where the correction circuit comprises a processor, the processor may also form the processing circuit.

According to a third aspect of the invention, we provide a method of operating a transceiver circuit, comprising:
  generating and transmitting an output signal;
  transmitting the output signal;
  receiving a received signal;
  mixing the output signal and the received signal so as to produce a mixed signal; and
  filtering the mixed signal with a at least one filter so as to produce a filtered signal;
in which an unwanted portion of the output signal is received at the receiver without having been reflected from a target; and in which the method further comprises generating a simulated waveform being a simulation of the behaviour of each filter to the unwanted portion and applying a correction so as to remove the simulated waveform from the filtered signal.

Thus, by generating a simulated signal, the effects of the unwanted portion on each filter can be removed, whilst retaining more of the low frequency information in the filtered waveform than would be the case if the low frequency data was modified. A reflection-based target detection system using this method would therefore have better performance with respect to short range targets. This invention would have significantly lower cost in terms of memory usage than saving the response of each filter to all of the forms of the unwanted portion that it was likely to be received. It is also significantly more flexible than either of these approaches, as it will work for arbitrary forms of the output signal and so the unwanted portion; there is no need to know in advance and pre-calculate what needs to be corrected.

The method will typically comprise converting the filtered signal from an analogue signal to a digital signal. The method may comprise applying the correction to the filtered signal before or after the filtered signal has been converted to a digital signal. In any case, the correction will be applied before the filtered signal is subjected to any frequency analysis such as a fast Fourier transform (FFT).

Where the correction is applied to the filtered signal after the filtered signal has been converted to a digital signal, the simulated waveform may be of the form of a digital signal, and the method may comprise additively removing the simulated waveform from the filtered, digital signal, for example by subtraction.

Where the correction is applied to the filtered signal before it is converted to a digital signal, the method may comprise using a differential analogue to digital converter, having two inputs; a first for the filtered signal and a second differential input for the simulated waveform.

This can allow higher gains to be used in the analogue to digital converter without it clipping, which could improve performance of a reflection-based target detection system using this transceiver to detect targets at higher ranges.

The method may comprise creating the simulated waveform in digital form, and then typically converting the simulated waveform to analogue form so that it can be applied to the filtered signal.

Alternatively, the method may comprise creating an estimate of the waveform of the unwanted portion passing the estimate through at least one further filter; thus the output of the at least one further filter may be the simulated waveform, as it may represent the at least one filter's response to the unwanted portion. As such, this uses a second set of filter(s) to simulate the response of the original filter(s). Typically, each further filter should have the same, or at least approximately the same, characteristics as each original filter. This may enable each further filter to model the behavior of each (original) filter to environmental changes such as temperature.

The method may comprise generating the simulated waveform using a plurality of parameters; typically, these will number less than 20, and typically less than 10. The parameters may comprise at least one pole, at least one zero and at least one gain of the filter; typically, the parameters will consist of two poles, two zeros and a gain.

The transceiver circuit may be in accordance with the first aspect of the invention, and may have any of its optional features.

The method may comprise using the transceiver circuit in a target detection system, in which the transmitted and received signals are compared so as to determine the presence of targets.

Typically, the target detection system would be a radar system, typically a frequency modulated continuous wave radar, in which case the transmitted and received signals would be radio signals. Alternatively, the target detection system may be a lidar system, in which case the transmitted and received signals would be light signals, or a sonar system, in which case the transmitted and received signals would be sound signals.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 5:
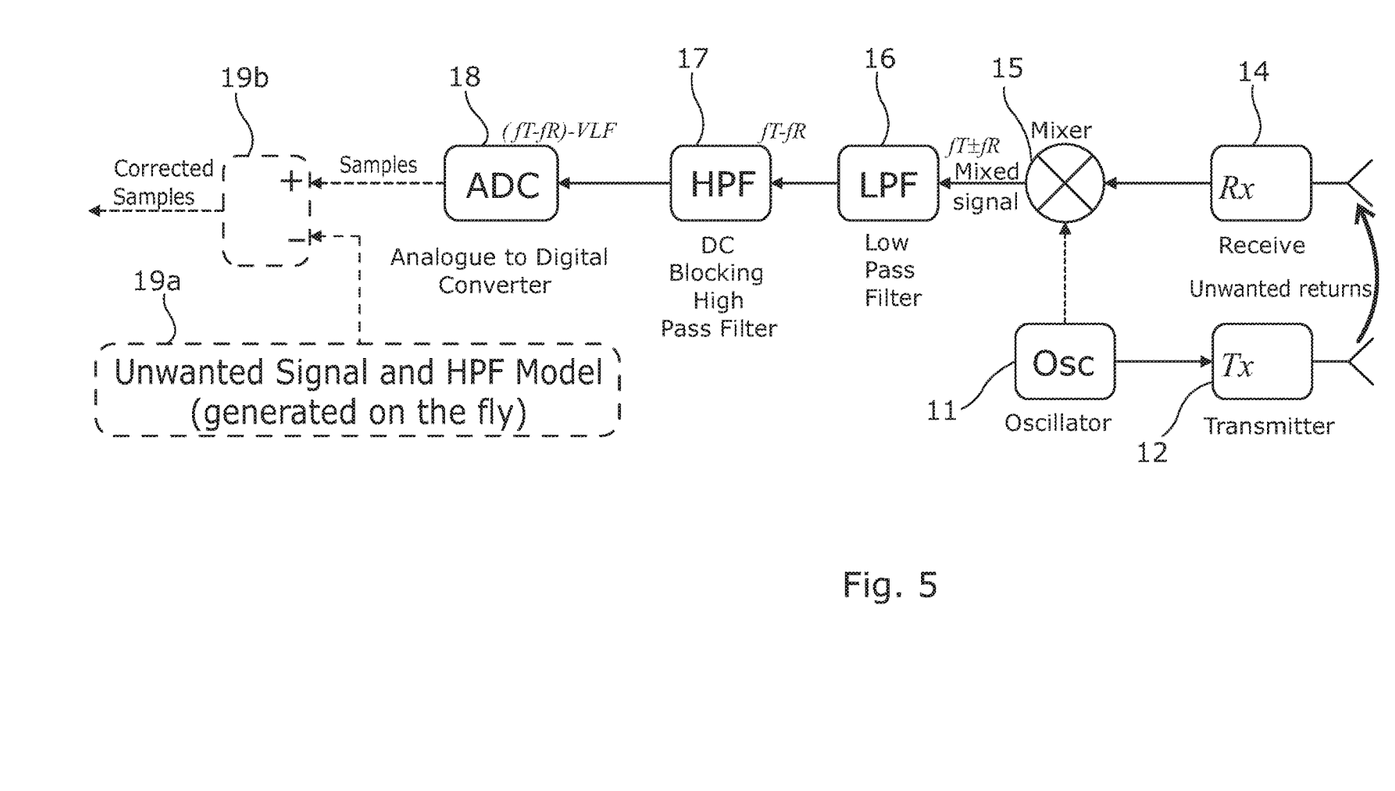
FIG. 5 shows a radar transceiver circuit in accordance with a first embodiment of the invention.

A frequency-modulated continuous wave radar transceiver circuit according to a first embodiment of the invention is shown in FIG. 5 of the accompanying drawings. In this embodiment, the circuit functions largely in the same manner as that discussed above in respect to FIG. 1, and so equivalent reference numerals have been used to that circuit, raised by 10.

In this embodiment, a correction circuit 19a, 19b acts to correct the filtered waveform for the transient effects of the low pass filter 16. It comprises a correction signal generation unit 19a, which creates a correction signal for the filtered waveform, and a correction application unit 19b, which subtracts the correction signal from the filtered waveform.

The correction signal is generated by predicting the behavior of the high pass filter 17 by simulating it as a simple analogue filter having 5 parameters which will describe it fully: 2 poles, 2 zeros and an overall DC-gain. In addition, the size/shape of the "step" or "impulse" input may need to be modeled; this can be based upon the output signal chosen. The parameters can be estimated during runtime (e.g. by minimizing the low frequency components in the corrected samples over a long time period), or calibrated in at manufacture or service time (e.g. when the filter parameters do not vary significantly with time). From these parameters, the contribution of the filter to the sampled waveform—the correction signal—can be calculated on-the-fly for each transient as it occurs and subtracted from the digitized filtered signal. This provides the benefit of very good cancellation with only minimal use of memory locations for storing the parameters—improving the capability of the radar to detect low-range targets.

In this embodiment, the correction circuit 19b, 19a will largely be implemented in software; those functions carried out by software are shown in dotted lines in FIG. 5. As such, the correction circuit 19b, 19a can use the same processor that is then used to process the digitized and corrected filtered signal.

Figure 8:
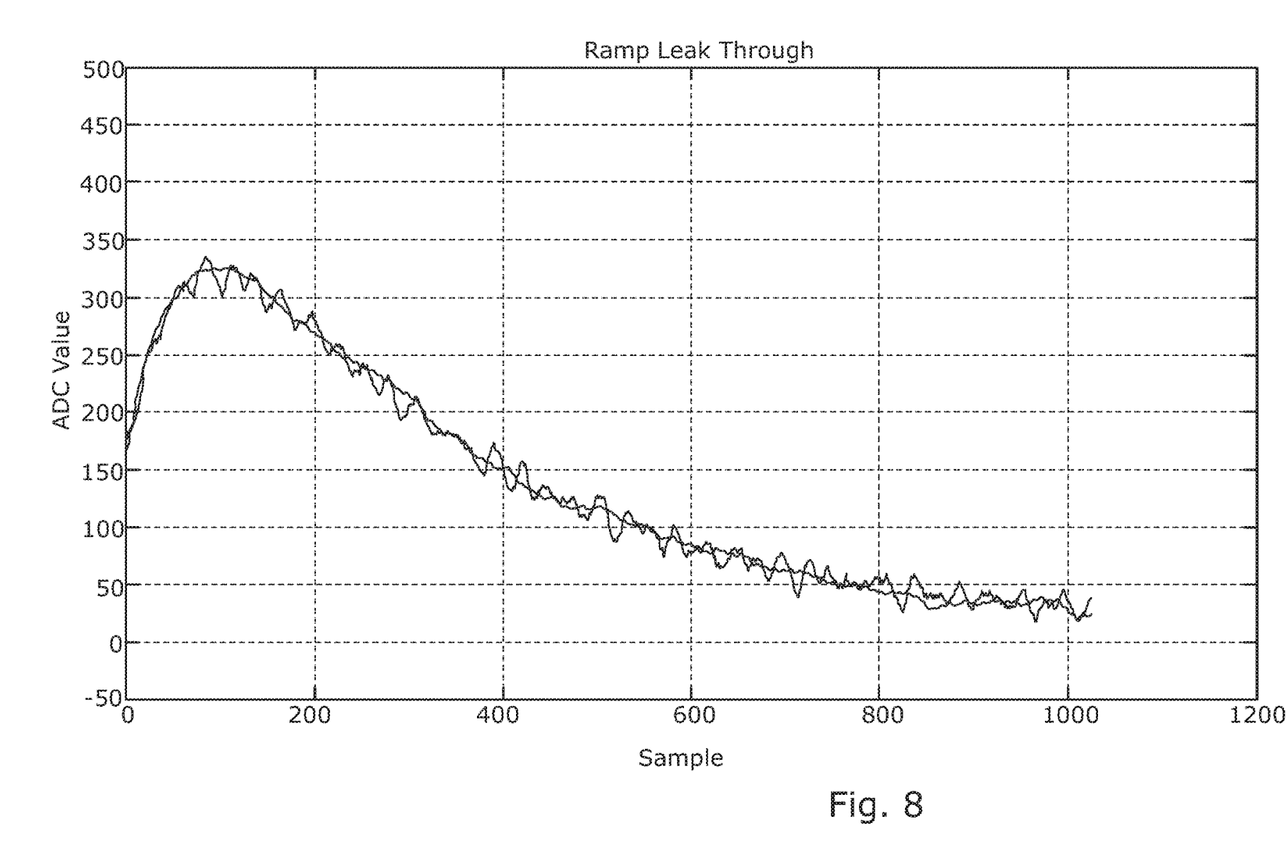
FIG. 8 shows the effects of the unwanted portion of the high pass filter of the circuit of FIG. 5.
Figure 9:
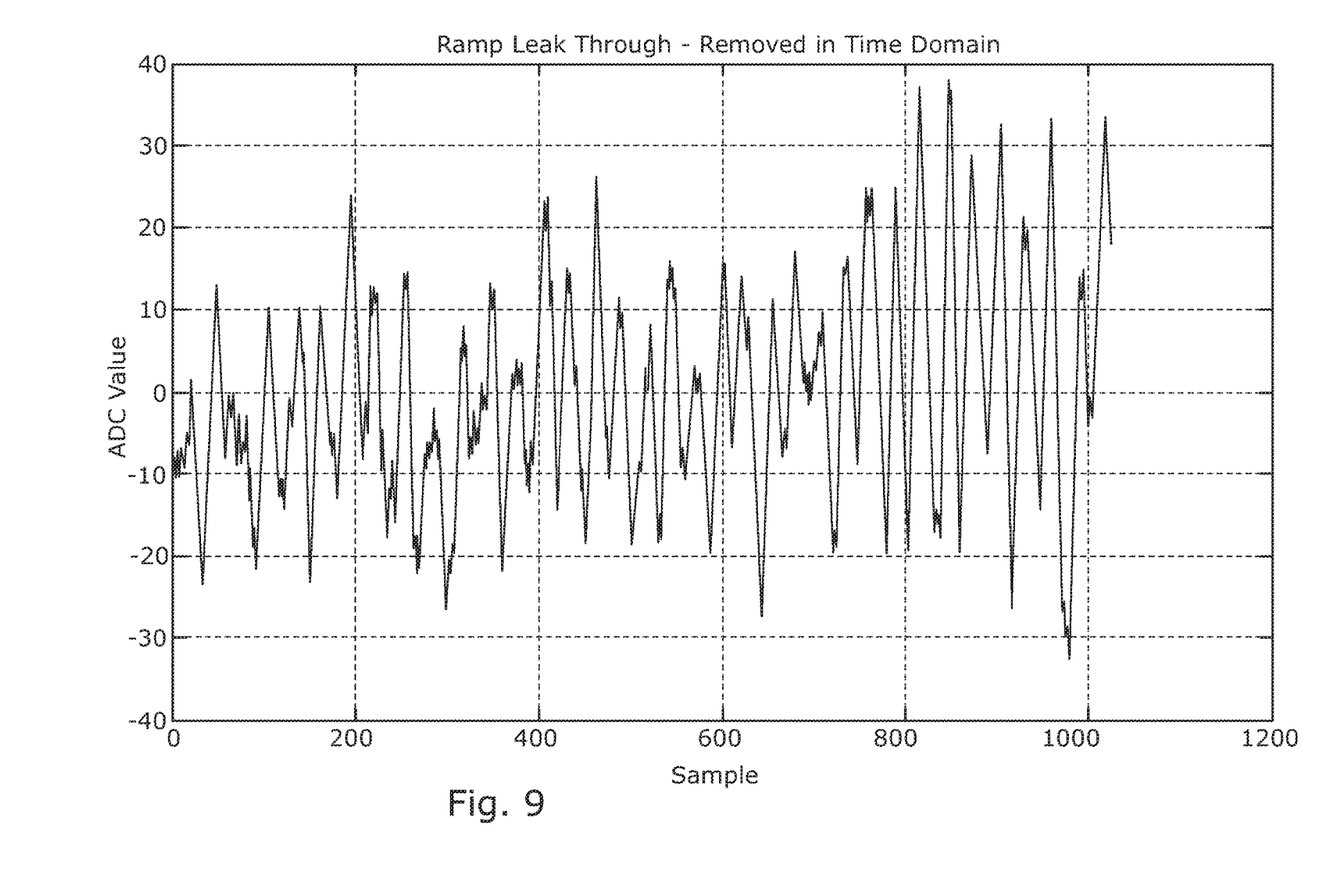
FIG. 9 shows the removal of the effects of the unwanted portion on the high pass filter of the circuit of FIG. 5.

The effects of this embodiment can be seen in FIGS. 8 and 9 of the accompanying drawings. FIG. 8 shows the filtered signal (the higher-frequency trace), with the transient effects shown as the lower frequency, smoother trace. By carrying out the method of this embodiment, the results shown in FIG. 9 can be achieved; note the difference in the vertical axis. The unwanted transient—which can be as much as 10 times the underlying signal—has been removed, without unduly affecting the low-frequency components of the underlying signal. This can make this embodiment more sensitive to low-range targets than the previous proposals which relied upon losing low-frequency data in the spectral domain.

Figure 6:
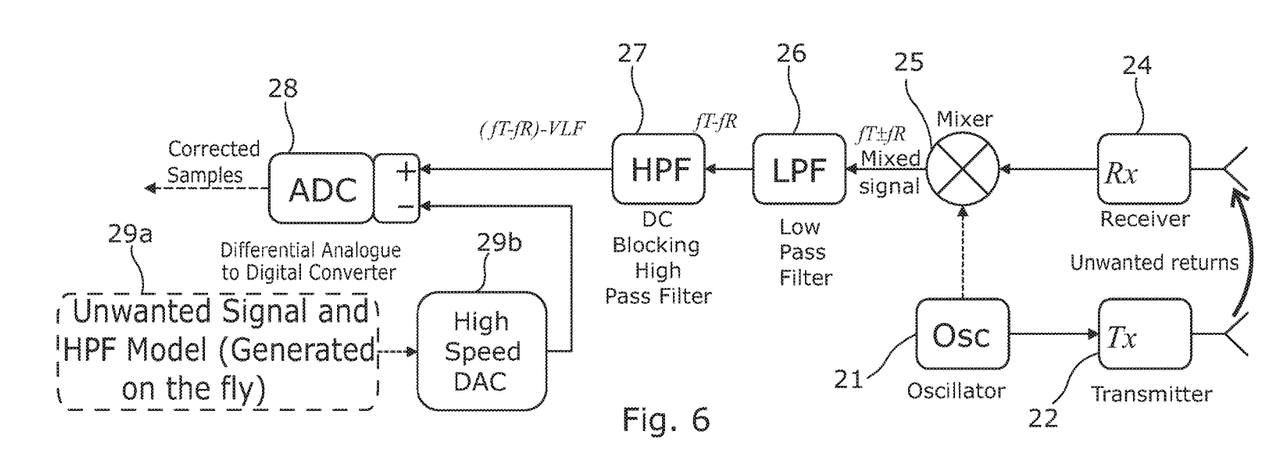
FIG. 6 shows a radar transceiver circuit in accordance with a second embodiment of the invention.

A second embodiment of the invention is shown in FIG. 6 of the accompanying drawings. As before, the circuit functions largely in the same manner as that discussed above in respect to FIG. 1, and so equivalent reference numerals have been used to that circuit, raised by 20.

In this embodiment, rather than applying the correction signal in the digital domain, it is applied in the analogue domain. The correction signal is generated in correction signal generation unit 29a as before, but then is converted into the digital domain by a high speed digital to analogue converter (DAC) 29b. The analogue to digital converter (ADC) 28 used is then a differential ADC, which takes the analogue filtered signal from the mixer on one input and the analogue correction signal on its other, differential input. This would allow much higher gains to be used without the unwanted transient causing the ADC to clip. This would produce higher performance when detecting long range targets.

Again, at least part of the function of the correction circuit 29a, 29b can be implemented in software on a suitable processor; the features carried out in software are shown in dotted lines in FIG. 6.

Figure 7:
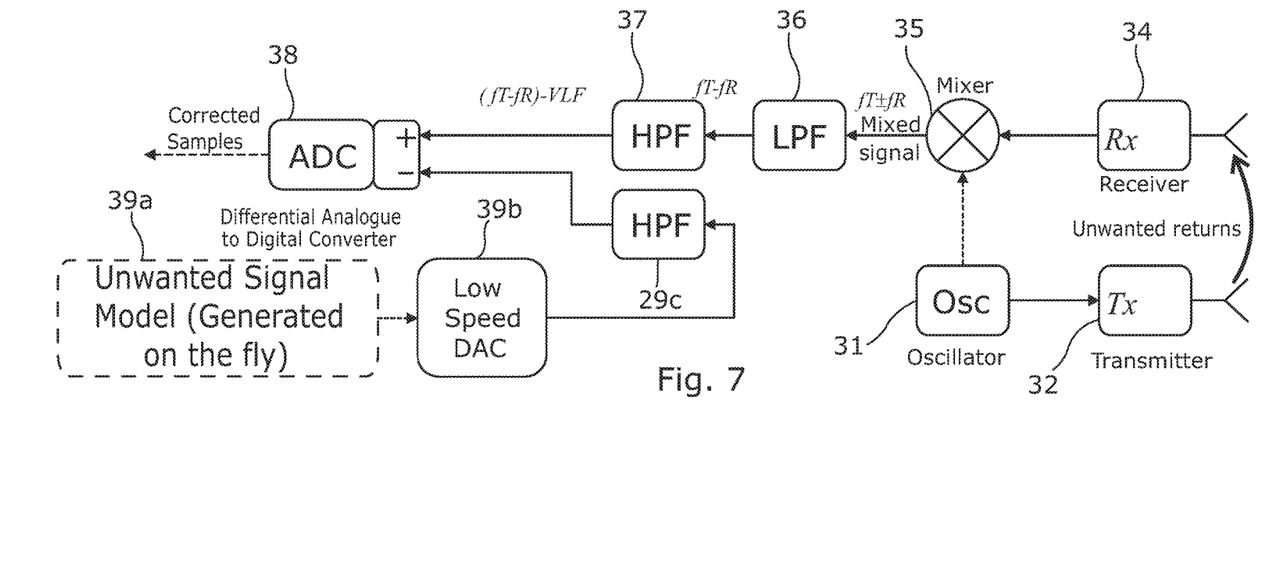
FIG. 7 shows a radar transceiver circuit in accordance with a third embodiment of the invention.

A third embodiment of the invention is shown in FIG. 7 of the accompanying drawings. As before, the circuit functions largely in the same manner as that discussed above in respect to FIG. 1, and so equivalent reference numerals have been used to that circuit, raised by 30.

In this embodiment, a relatively slower DAC 39b is used, but which is fed with an estimate of the unwanted portion rather the correction signal itself. The correction signal is created by passing the resulting analogue output of the second DAC 40 through a further, similar high pass filter 39c to the original high pass filter 37 which is corrupting the wanted signal. The two outputs—the filtered output of the high pass filter 37 and the correction signal generated by the further high pass filter 39c is fed to a differential ADC 38 as in the previous embodiment. This embodiment requires even less storage of data and reduces the need for a fast, accurate DAC, but adds a few more relatively cheap components. This would depend on the "similar filter" 39c being sufficiently representative of the high pass filter 39c (with regard to component tolerances etc.). Additional benefit of this approach is that the further high pass filter 39c would have similar characteristics to the first high pass filter 37 such as change in frequency response due to temperature, etc.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A transceiver circuit, comprising:
a signal generator arranged to generate an output signal;
a transmitter coupled to the signal generator so as to transmit the output signal;
a receiver arranged to receive a received signal;
a mixer coupled to the receiver and to the signal generator so as to mix the output signal and the received signal so as to produce a mixed signal; and
at least one filter coupled to the mixer so as to act upon the mixed signal to produce a filtered signal;
in which an unwanted portion of the output signal is received at the receiver without having been reflected from a target; and in which the transceiver circuit further comprises a correction circuit arranged to generate a simulated waveform being a simulation of the behaviour of the at least one filter to the unwanted portion and to apply a correction so as to remove the simulated waveform from the filtered signal;
in which the transceiver circuit comprises an analogue to digital converter coupled to the at least one filter so as to convert the filtered signal from an analogue signal to a digital signal; and
in which the correction circuit is arranged so as to apply the correction to the filtered signal before the filtered signal has been converted to a digital signal.

2. The circuit of claim 1, in which the correction is applied before the filtered signal is subjected to any frequency analysis.

3. The circuit of claim 1, in which the analogue to digital converter is a differential analogue to digital converter, having two inputs: a first input for the filtered signal and a second differential input for the simulated waveform.

4. The circuit of claim 1, in which, in order to create the simulated waveform, the correction circuit comprises a digital signal creation circuit arranged to create the simulated waveform in digital form, and a digital to analogue converter arranged to convert the simulated waveform to analogue form so that the simulated waveform can be applied to the filtered signal.

5. The circuit of claim 1, in which the correction circuit comprises an unwanted signal creation circuit arranged to create an estimate of the waveform of the unwanted portion and a further filter to which the estimate of the waveform is applied.

6. The circuit of claim 1, in which the correction circuit is arranged so as to generate the simulated waveform using a plurality of parameters.

7. A target detection system, comprising:
a transceiver circuit, comprising:
a signal generator arranged to generate an output signal;
a transmitter coupled to the signal generator so as to transmit the output signal; a receiver arranged to receive a received signal;
a mixer coupled to the receiver and to the signal generator so as to mix the output signal and the received signal so as to produce a mixed signal; and
at least one filter coupled to the mixer so as to act upon the mixed signal to produce a filtered signal;
in which an unwanted portion of the output signal is received at the receiver without having been reflected from a target; and
in which the transceiver circuit further comprises a correction circuit arranged to generate a simulated waveform being a simulation of the behaviour of the at least one filter to the unwanted portion and to apply a correction so as to remove the simulated waveform from the filtered signal and is arranged to transmit the output signal and to receive the received signal,
the system further comprising a processing circuit arranged to compare the transmitted and received signals so as to determine the presence of targets;
in which the transceiver circuit comprises an analogue to digital converter coupled to the at least one filter so as to convert the filtered signal from an analogue signal to a digital signal; and
in which the correction circuit is arranged so as to apply the correction to the filtered signal before the filtered signal has been converted to a digital signal.

8. A method of operating a transceiver circuit, comprising the steps of:
generating and transmitting an output signal;
transmitting the output signal;
receiving a received signal;
mixing the output signal and the received signal so as to produce a mixed signal; and
filtering the mixed signal with at least one filter so as to produce a filtered signal;
in which an unwanted portion of the output signal is received at the receiver without having been reflected from a target; and in which the method further comprises generating a simulated waveform being a simulation of the behaviour of the at least one filter to the unwanted portion and applying a correction so as to remove the simulated waveform from the filtered signal;

converting the filtered signal from an analogue signal to a digital signal; and applying the correction to the filtered signal before the filtered signal has been converted to a digital signal.

9. The method of claim 8, in which the correction is applied before the filtered signal is subjected to any frequency analysis such as a Fast Fourier Transform (FFT).

10. The method of claim 8, comprising using a differential analogue to digital converter, having two inputs: a first for the filtered signal and a second differential input for the simulated waveform.

11. The method of claim 8, comprising creating the simulated waveform in digital form, and then converting the simulated waveform to analogue form so that the simulated waveform can be applied to the filtered signal.

12. The method of claim 8, comprising creating an estimate of the waveform of the unwanted portion and passing the estimate through a further filter.

13. The method of claim 9, comprising generating the simulated waveform using a plurality of parameters, comprising at least one pole, at least one zero and at least one gain of the at least one filter.

* * * * *